March 14, 1933.    R. J. MAMMES    1,901,110
REVERSIBLE MAT
Filed Dec. 12, 1927
Fig.1.
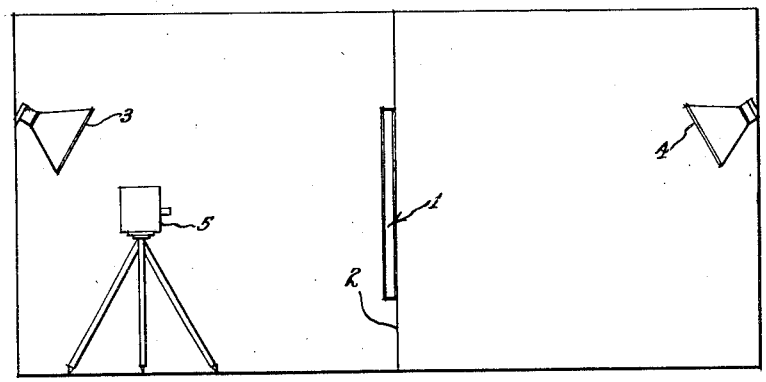
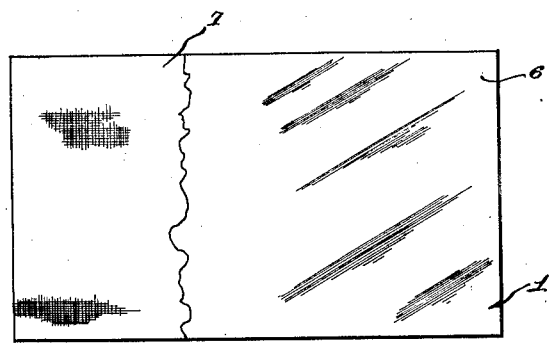
Fig.2.
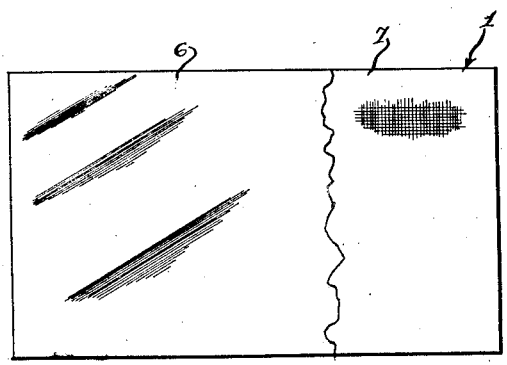
Fig.3.
Inventor
Raymond J. Mammes
By Lyon & Lyon
Attorneys Patented Mar. 14, 1933

1,901,110

UNITED STATES PATENT OFFICE

RAYMOND J. MAMMES, OF LOS ANGELES, CALIFORNIA, ASSIGNOR TO METRO-GOLDWYN-MAYER CORPORATION, OF CULVER CITY, CALIFORNIA, A CORPORATION OF NEW YORK

REVERSIBLE MAT

Application filed December 12, 1927. Serial No. 239,354.

This invention relates to reversible mats, and is more particularly related to a reversible mat adapted for use in the production of motion picture films in the combining of a multiplicity of scenes taken separately upon a single film.

In the taking of motion pictures, scenes are often combined in a single film to form a composite picture, the different scenes of which may have been taken at widely removed points and are put together to produce the finished scene on the film. For example a scene of the actors may be taken upon a set and a second scene giving the background may be taken at a point removed from the position of taking the original scene. The scenes are then combined by projection printing, using a mat to mat out the part of the film not desired to be printed during the printing of either scene on the final film. Mats employed in this method usually leave a line on the finished film where the two scenes are united.

It is, therefore, an object of this invention to provide a reversible mat which may be used for the purpose of combining a multiplicity of scenes upon a single film to form a composite picture without producing in the film a line or lines.

Another object of this invention is to provide a reversible mat adapted for use in the method or methods of making composite pictures from a multiplicity of separately taken scenes and which reversible mat includes a plate of transparent material, such as glass, having lighting means upon its opposite sides and which glass is painted to form the mat. The transparent material is preferably partly and selectively covered with a material which is substantially opaque, that is, will not transmit light, but which will reflect light. Substantially all paints, with the exception of dull black, may be used for this purpose. The reversibility of the mat is obtained by use of lights on the opposite sides of the mat. The light on one side of the mat is illuminated in order to illuminate the painted part of the glass, making this part a printing surface. The mat being enclosed in a frame or partition positioned in a room or housing, the unpainted parts of the glass provide a black mat. To reverse the mat, the glass is illuminated from the reverse side and the light shines through the unpainted parts producing a printing surface and the painted part or parts of the glass provide a mat surface. The interior of the room or housing in which the frame, mat and lights are placed is preferably dark so as to provide a non-reflective background for the transparent material of the mat.

Other objects and advantages of this invention, it is believed, will be apparent from the following detailed description of a preferred embodiment thereof, as illustrated in the accompanying drawing.

In the drawing:

Figure 1 is a diagrammatic view illustrating the reversible mat and manner of using the same in the making of composite films from a plurality of scenes.

Figure 2 is a front elevation of a reversible mat embodying this invention.

Figure 3 is a rear elevation thereof.

In the preferred embodiment of this invention, illustrated in the accompanying drawing, 1 indicates a reversible mat which is formed of a sheet of substantially transparent material such, or example, as glass or the like through which light will pass either directly or to give a diffused light. The mat 1 is mounted in a frame 2, preferably formed of black velvet or like black material. Mounted upon the opposite sides of the mat 1 are lamps or lights 3 and 4. The camera 5 is positioned in front of the mat 1. The frame, mat, lights and camera are positioned in a room or housing whose interior surfaces are dark, thereby providing the non-reflective background for the transparent material of the mat. The reversible mat is obtained by painting upon the surface the particular mat surface desired such, for example, as illustrated at 6. The remaining portion 7 of the mat 1 may be allowed to remain untouched.

The lamp 3 in front of mat 1 is illuminated (lamp 4 being unilluminated), thus causing the portion 6 of the mat 1 to become an illuminated light reflecting or printing surface or object, while the portion 7 is black, unlighted and, therefore, not a printing surface. Light reflected from the illuminated light reflecting area 6 passes into camera 5 and an image of such area is photographed upon the film in camera 5, whereas an area such as area 7 is unexposed on the film in camera 5. The resulting film after being developed would consist of a transparent area 7 and an opaque area 6, thus forming a mat. Before developing, however, and without changing the position of the camera, the lights 3 may be extinguished and lights 4 illuminated, the film advanced and the mat 1 again photographed, thus obtaining a reverse mat on another portion of the same film in camera 5. The resulting mat from the last named sequence of steps (with light supplied by lights 4) is the reverse of the first mat, inasmuch as light will now pass through the transparent portion 7 of the mat 1 and be recorded on the film in the camera, whereas no light will pass through or be emitted from the opaque portion 6, and such part will result in a transparent portion on the film after developing the same.

Reverse mats can thus be obtained with absolute security that the two will be perfectly complementary. The resulting film mats can be used successfully in double printing or double exposure methods of composite photography, without the formation of joint lines. If desired, a positive film bearing images which are in part to be printed upon an unexposed negative film in camera 5 can be superposed on the unexposed film in camera 5, and the operation as described hereinabove carried out, namely, the unexposed negative and the positive may be simultaneously run through the camera and a part of the film in camera 5 exposed by light reflected from the painted portion 6 of the mat 1. During such exposure, necessarily only those parts of the positive will be printed upon the unexposed negative film as correspond to the painted portion 6 of the mat 1. At the conclusion of this operation the partly exposed negative film may be rewound, another positive bearing different images superposed on such partly exposed negative, and both films run through the camera a second time, the lights being changed so that the printing light now comes from the transparent portion 7 of the mat 1, passes through the positive and prints only such portions of the positive from the negative as are affected by light from the portion 7 of the mat 1.

Any suitable or desirable number of scenes may be taken on the film in the camera 5 by multiplying these operations, using the mat 1 and painting different mat surfaces thereon. The use of the glass 1 to produce the different mat surfaces by means of the light transmitted and reflected from its opposite surfaces in the manner heretofore described eliminates the line formation on the finished film having the composite scenes thereon as there is a perfect match of the mat surfaces by this method.

Having fully described my invention, it is to be understood that I do not wish to be limited to the details herein set forth, but my invention is of the full scope of the appended claims.

I claim:

1. An apparatus for producing reversible mats, comprising a frame of non-light reflecting material, a plate of transparent material positioned in said frame, a portion of said plate being covered with opaque but light reflecting material, a non-reflective background for said plate, separate means for illuminating the front and rear of said plate, said illuminating means being adapted to be selectively operated to illuminate the front or rear of said plate, and a camera directed toward said plate and adapted to photograph one side thereof.

2. In an apparatus for producing complementary reverse mats, the combination of a non-light reflecting frame, a transparent plate in said frame, a portion of said plate being covered with an opaque but light reflecting material, a non-reflective background for said plate, and illuminating means on either side of the plate, said illuminating means being adapted to be alternately operated to illuminate either front or rear portions of said plate.

3. A method of forming complementary mats which comprises covering portions of a transparent plate with an opaque light reflecting material, positioning said plate before a black background, photographing the front of said plate while the front of the plate is illuminated, and then photographing the front of the plate on a separate film area while the back of the plate is illuminated.

Signed at Culver City, California, this 2nd day of December, 1927.

RAYMOND J. MAMMES.